(12) United States Patent
Lin et al.

(10) Patent No.: US 11,224,058 B2
(45) Date of Patent: Jan. 11, 2022

(54) DEVICE AND METHOD FOR GENERATING A PHYSICAL LAYER CONVERGENCE PROCEDURE (PLCP) USING AGGREGATION OPERATION

(71) Applicant: MEDIATEK INC., Hsin-Chu (TW)

(72) Inventors: Ying-You Lin, Hsinchu (TW); Chih-Kun Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 209 days.

(21) Appl. No.: 16/716,528

(22) Filed: Dec. 17, 2019

(65) Prior Publication Data

US 2021/0185708 A1 Jun. 17, 2021

(51) Int. Cl.
*H04W 72/12* (2009.01)
*H04W 52/02* (2009.01)
*H04W 28/02* (2009.01)
*H04L 29/06* (2006.01)
*H04W 80/02* (2009.01)

(52) U.S. Cl.
CPC ......... *H04W 72/1268* (2013.01); *H04L 69/22* (2013.01); *H04W 28/0278* (2013.01); *H04W 52/0235* (2013.01); *H04W 80/02* (2013.01)

(58) Field of Classification Search
CPC ......... H04W 72/1268; H04W 28/0278; H04W 52/0235; H04W 80/02; H04W 72/1273; H04W 52/00; H04W 80/00; H04L 69/22; H04L 43/02; H04L 47/2483
See application file for complete search history.

(56) References Cited

U.S. PATENT DOCUMENTS

| 2007/0206628 | A1* | 9/2007 | Nishio | H04B 7/15528 370/445 |
| 2008/0192776 | A1* | 8/2008 | Fleming | H04L 7/041 370/514 |
| 2012/0207139 | A1* | 8/2012 | Husted | H04W 84/12 370/338 |
| 2016/0315681 | A1* | 10/2016 | Moon | H04W 74/0816 |
| 2018/0227396 | A1* | 8/2018 | Shani | H04L 69/22 |
| 2018/0376460 | A1* | 12/2018 | Atefi | H04W 74/0816 |

FOREIGN PATENT DOCUMENTS

| CN | 107182076 A | 9/2017 |
| CN | 107409074 A | 11/2017 |

* cited by examiner

*Primary Examiner* — Mewale A Ambaye
(74) *Attorney, Agent, or Firm* — Winston Hsu

(57) ABSTRACT

A wireless communication device includes an aggregation circuit, a processing circuit and a transmitter. The aggregation circuit is arranged to execute an aggregation operation to generate a Physical Layer Convergence Procedure (PLCP) Protocol Data Unit (PPDU). The processing circuit is coupled to the aggregation circuit and arranged to generate a first indicator indicating a length of the PPDU and include the first indicator into a first field in a preamble of the PPDU. The transmitter is coupled to the processing circuit and arranged to transmit the PPDU to an access point.

14 Claims, 5 Drawing Sheets

DEVICE AND METHOD FOR GENERATING A PHYSICAL LAYER CONVERGENCE PROCEDURE (PLCP) USING AGGREGATION OPERATION

BACKGROUND

The present invention relates to a wireless communication device, and more particularly, to a wireless communication device which can save communication time and power, and an associated method and electronic device.

One of the features of the IEEE 802.11ax specification is that an access point (AP) sends a trigger frame to schedule UpLink (UL) resources units (RUs) for multiple stations (STAs). In order to provide efficient RU allocation, the AP needs to have UL buffer status of the STAs. Therefore, the AP needs to determine a suitable Physical Layer Convergence Procedure (PLCP) Protocol Data Unit (PPDU) length of a UL triggered based PPDU in the trigger frame, and a specific field such as a Legacy Signal Field (L-SIG) thereof. For single user (SU) transmission, the STA following the trigger frame sent by the AP might have low throughput since the aggregation size estimated by the AP is not accurate due to huge variation in each packet size, which results in a waste of communication time and power.

A novel wireless communication device and method are required to solve the aforementioned problem.

SUMMARY

One of the objectives of the present invention is to provide a wireless communication device, an associated method and an electronic device, to solve the aforementioned problem.

According to an embodiment of the present invention, a wireless communication device is disclosed, comprising: an aggregation circuit, a processing circuit and a transmitter. The aggregation circuit is arranged to execute an aggregation operation to generate a Physical Layer Convergence Procedure (PLCP) Protocol Data Unit (PPDU). The processing circuit is coupled to the aggregation circuit and arranged to generate a first indicator indicating a length of the PPDU and include the first indicator into a first field in a preamble of the PPDU. The transmitter is coupled to the processing circuit and arranged to transmit the PPDU to an access point (AP).

According to an embodiment of the present invention, a wireless communication method is disclosed, comprising: executing an aggregation operation to generate a Physical Layer Convergence Procedure (PLCP) Protocol Data Unit (PPDU); generating a first indicator indicating a length of the PPDU and including the first indicator into a first field in a preamble of the PPDU; and transmitting the PPDU to an access point (AP).

According to an embodiment of the present invention, an electronic device is disclosed, comprising: a transmitter, a storage device and a processor. The transmitter is arranged to transmit signals to an access point (AP). The storage device is arranged to store a program code. The processor is arranged to execute the program code, wherein when loaded and executed by the processor, the program code instructs the processor to execute the following steps: executing an aggregation operation to generate a Physical Layer Convergence Procedure (PLCP) Protocol Data Unit (PPDU); generating an first indicator indicating a length of the PPDU and including the first indicator into a first field in a preamble of the PPDU; and controlling the transmitter to transmit the PPDU to the AP.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
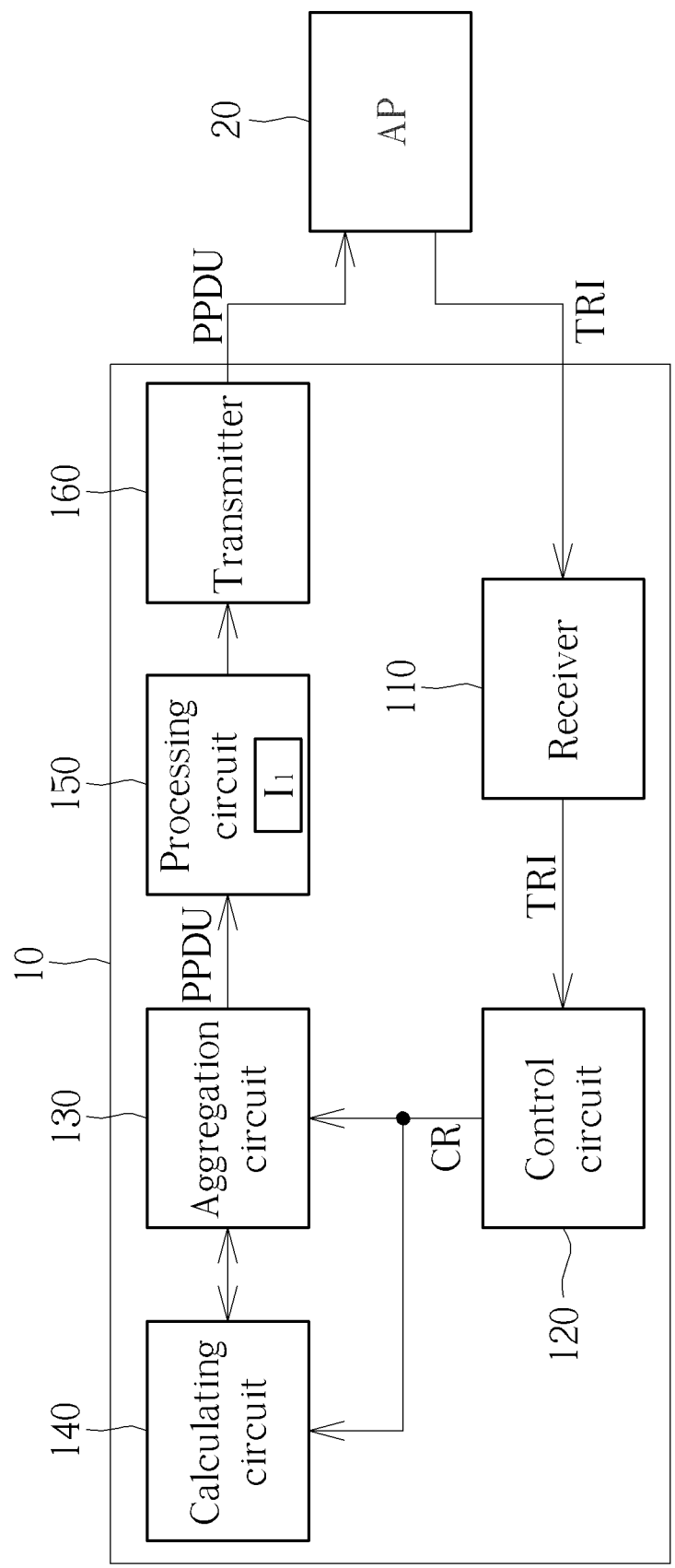
FIG. 1 is a diagram illustrating a wireless communication device communicating with an AP according to an embodiment of the present invention.

FIG. 1 is a diagram illustrating a wireless communication device 10 communicating with an access point (AP) 20 according to an embodiment of the present invention. In this embodiment, the wireless communication device 10 can be any type of device wirelessly communicating with the AP 20. For example, the wireless communication device 10 can be a mobile phone, a personal computer (e.g. a desktop computer or a laptop), a personal digital assistant, etc.; and the present invention is not limited to these examples. The wireless communication device 10 comprises a receiver 110, a control circuit 120, an aggregation circuit 130, a calculating circuit 140, a processing circuit 150 and a transmitter 160. As shown in FIG. 1, the wireless communication device 10 receives a trigger frame TRI sent by the AP 20 for initiating a communication via the receiver 110. The receiver 110 transfers the received trigger frame TRI to the control circuit 120. The control circuit 120 is arranged to check the trigger frame TRI to generate a checking result CR. Some fields such as a receiver access (RA) field or a user info field in the trigger frame TRI indicate that all devices are destined to receive this trigger frame TRI. The control circuit 120 checks the aforementioned fields in the trigger frame TRI to determine if the trigger frame TRI is only transmitted to the wireless communication device 10, i.e. the single user (SU) transmission, and generates the checking result CR accordingly. The aggregation circuit 130 is arranged to execute an aggregation operation upon the data to be transmitted to the AP 20 in the SU Uplink (UL) transmission to generate a Physical Layer Convergence Procedure (PLCP) Protocol Data Unit (PPDU). The calculating circuit 140 is arranged to calculate a length of the PPDU based on either the indication of the trigger frame, a sequence number information such as a block acknowledgement (BA) sent by the AP 20, or according to the PPDU generated by the aggregation circuit 130.

In one embodiment, when the control circuit learns that the trigger frame TRI is only transmitted to the wireless communication device, i.e. the SU transmission, the control circuit 120 generates the checking result CR accordingly. The aggregation circuit 130 directly executes the aggregation operation upon the data to be transmitted to the AP 20 for generating the PPDU without referring to the length defined by an indicator of a specific field in a preamble of the trigger frame TRI. For example, the specific field is a Legacy Signal Field (L-SIG), and the indicator is the value represented by the L-SIG. The calculating circuit 140 then calculates the length of the PPDU based on the PPDU generated by the aggregation circuit 130.

In another embodiment, the calculating circuit 140 calculates the length of the PPDU based on the sequence number information before the trigger frame TRI is received by the receiver 110 without referring to the length defined by the L-SIG of the trigger frame TRI. As those skilled in the art should readily understand the calculation of the length of the PPDU based on the sequence number information, the detailed description is omitted here for brevity. The aggregation circuit 130 executes the aggregation operation upon the data to be transmitted to the AP 20 to generate the PPDU according to the length of the PPDU calculated by the calculating circuit 140 when the trigger frame TRI is received and the checking result CR indicates that the trigger frame TRI is only transmitted to the wireless communication device 10.

As mentioned in the prior art, regarding the SU transmission, the aggregation size estimated by the AP 20 is not accurate due to huge variation in each packet size, resulting in a waste of communication time and power. In the aforementioned embodiments, however, the length of the PPDU is determined without referring to the trigger frame TRI. As more length for the PPDU is saved, the communication time and power are accordingly reduced.

Refer to FIG. 1 again. After the PPDU is generated by the aggregation circuit 130 and the length of the PPDU is calculated by the calculating circuit 140, the processing circuit 150 generates an indicator $I_1$ according to the length of the PPDU and writes the indicator $I_1$ into an L-SIG in a preamble of the PPDU. The transmitter 160 transmits the PPDU with the new calculated L-SIG to the AP 20 to inform the length of the PPDU.

In addition, when the control circuit learns that the trigger frame TRI is not only transmitted to the wireless communication device, i.e. Multi-User (MU) transmission, the control circuit generates the checking result CR accordingly. The calculating circuit 140 calculates the length of the PPDU based on the indicator of the L-SIG in the preamble of the trigger frame TRI. The aggregation circuit 130 will therefore execute the aggregation operation upon the data to be transmitted to the AP 20 according to the length of the PPDU calculated by the calculating circuit 130. In this scenario, the calculating circuit 140 calculates the length of the PPDU defined by the trigger frame TRI sent by the AP 20, and the aggregation circuit 130 executes the aggregation operation to generate the PPDU according to the length calculated by the calculating circuit 140. The processing circuit 150 thus does not write the length of the PPDU into the L-SIG in the preamble of the PPDU due to the length of the PPDU being defined by the AP 20, and the transmitter 160 transmits the PPDU to the AP 20.

Figure 2:
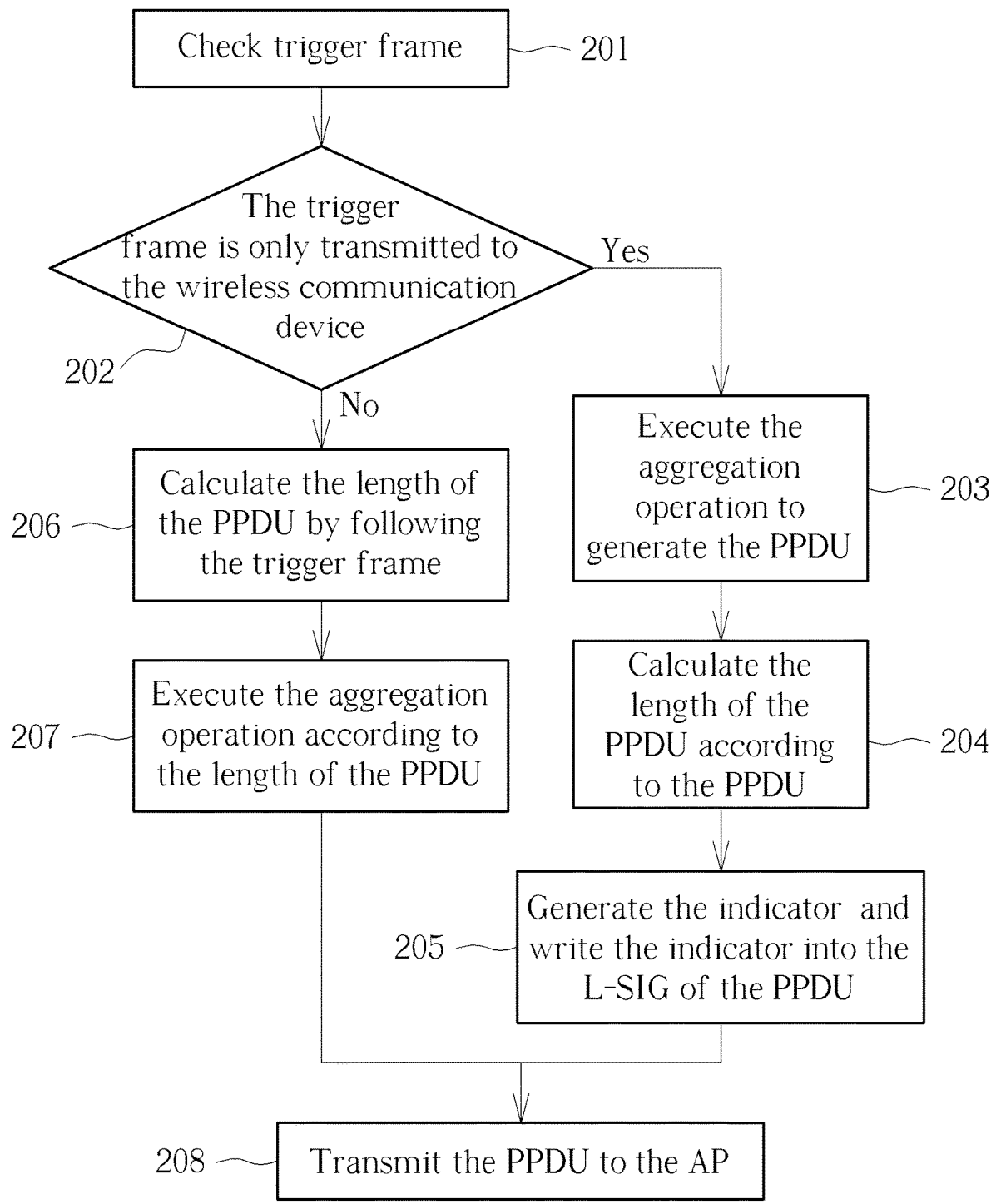
FIG. 2 is a flowchart illustrating the wireless communication method according to an embodiment of the present invention.

FIG. 2 is a flowchart illustrating the wireless communication method of the wireless communication device 10 according to an embodiment of the present invention. Provided that the result is substantially the same, the steps are not required to be executed in the exact order shown in FIG. 2. The wireless communicating method is summarized as follows:

Step 201: the control circuit 120 checks the received trigger frame TRI and generates the checking result CR;

Step 202: does the checking result CR indicate that the trigger frame TRI is only transmitted to the wireless communication device 10? If yes, go to step 203; otherwise, go to step 206;

Step 203: the aggregation circuit 130 executes the aggregation operation to generate the PPDU without referring to the L-SIG of the trigger frame TRI;

Step 204: the calculating circuit 140 calculates the length of the PPDU according to the PPDU generated by the aggregation circuit 130;

Step 205: the processing circuit 150 generates the indicator $I_1$ according to the length of the PPDU and writes the indicator $I_1$ into the L-SIG in the preamble of the PPDU;

Step 206: the calculating circuit 140 calculates the length of the PPDU based on the L-SIG in the preamble of the trigger frame TRI;

Step 207: the aggregation circuit 130 executes the aggregation operation to generate the PPDU according to the length of the PPDU calculated by the calculating circuit 140;

Step 208: the transmitter 160 transmits the PPDU to the AP 20.

Those skilled in the art should readily understand the wireless communication method shown in FIG. 2 after reading the embodiment of FIG. 1. The detailed description is omitted for brevity.

Figure 3:
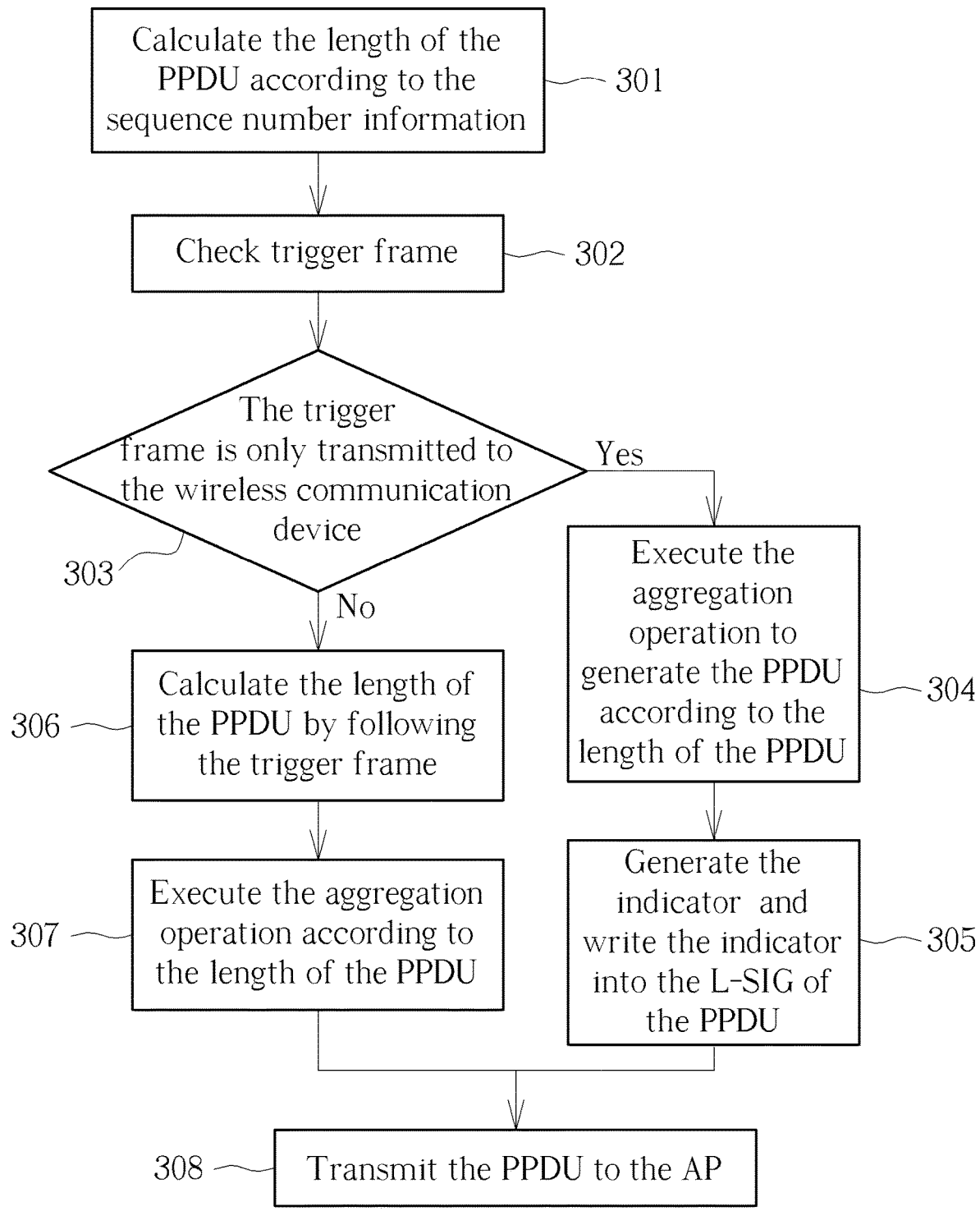
FIG. 3 is a flowchart illustrating the wireless communication method according to another embodiment of the present invention.

FIG. 3 is a flowchart illustrating the wireless communication method of the wireless communication device 10 according to another embodiment of the present invention. Provided that the result is substantially the same, the steps are not required to be executed in the exact order shown in FIG. 3. The wireless communicating method is summarized as follows:

Step 301: the calculating circuit 140 calculates the length of the PPDU based on the sequence number information;

Step 302: the control circuit 120 checks the received trigger frame TRI and generates the checking result CR;

Step 303: does the checking result CR indicate that the trigger frame TRI is only transmitted to the wireless communication device 10? If yes, go to step 304; otherwise, go to step 306;

Step 304: the aggregation circuit 130 executes the aggregation operation to generate the PPDU according to the length of the PPDU calculated by the calculating circuit 140;

Step 305: the processing circuit 150 generates the indicator $I_1$ according to the length of the PPDU and writes the indicator $I_1$ into the L-SIG in the preamble of the PPDU;

Step 306: the calculating circuit 140 calculates the length of the PPDU based on the L-SIG in the preamble of the trigger frame TRI;

Step 307: the aggregation circuit 130 executes the aggregation operation to generate the PPDU according to the length of the PPDU calculated by the calculating circuit 140;

Step 308: the transmitter 160 transmits the PPDU to the AP 20.

Those skilled in the art should readily understand the wireless communication method shown in FIG. 3 after reading the embodiment of FIG. 1. The detailed description is omitted for brevity.

Figure 4:
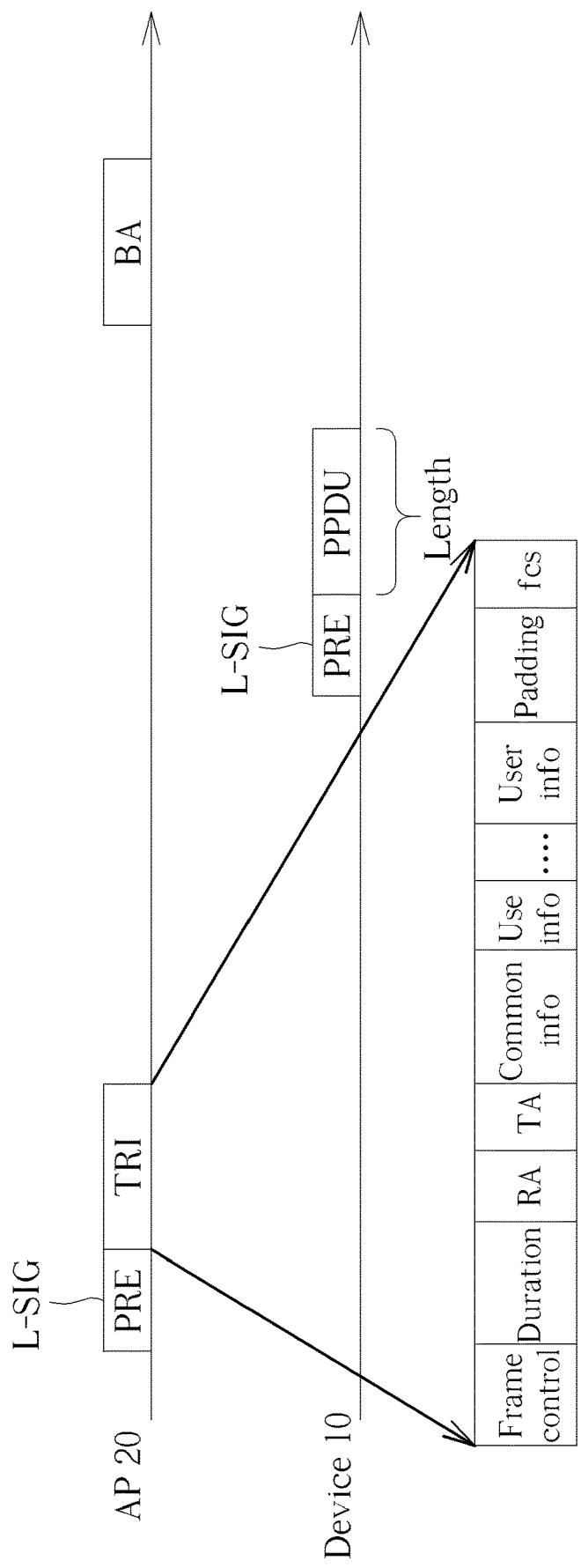
FIG. 4 is a diagram illustrating communication between the AP and the wireless communication device according to an embodiment of the present invention.

FIG. 4 is a diagram illustrating communication between the AP 20 and the wireless communication device 10 according to an embodiment of the present invention. As shown in FIG. 4, the AP 20 transmits a trigger frame TRI with a preamble (marked "PRE" in FIG. 4), wherein the trigger frame TRI has fields such as a frame control field, a duration field, a RA field, a transmitter address (TA) field, a common info field, at least one user info field, a padding field and a Frame Control Sequence (FCS) field, etc. As mentioned above, the control circuit 120 of the wireless communication device 10 can learn whether the trigger frame TRI is only transmitted to the device 10 by checking the RA field and the user info field; this should be well-known to those skilled in the art. The detailed description regarding the format of the trigger frame TRI is therefore omitted for brevity. In addition, the L-SIG in the preamble of the trigger frame TRI defines the length of the PPDU estimated by the AP 20. After the trigger frame TRI is received by the receiver 110 of the wireless communication device 10, the wireless communication device 10 applies the wireless communication method illustrated in the embodiments of FIG. 2 or FIG. 3. When the trigger frame TRI is only transmitted to the wireless communication device 10, the L-SIG in the preamble of the PPDU indicates to the AP 20 the length of the PPDU calculated by the calculating circuit 140 of the wireless communication device 10. Traditionally, when the wireless communication device 10 utilizes the length defined by the AP 20 to generate the PPDU, some padding bits will be used in the remaining duration if the estimated length is longer than a MAC Protocol Data Unit (MPDU) of the PPDU. In the embodiments presented by the present invention, the wireless communication device 10 calculates the length of the PPDU without referring to the length estimated by the AP 20. The capacity of the padding bits used in the prior art can be saved, thus saving the communication time and power.

It should be noted that the implementations of those circuits shown in FIG. 1 are not limited in the present invention. In other words, the circuits shown in FIG. 1 can be implemented by hardware, software, or firmware.

Figure 5:
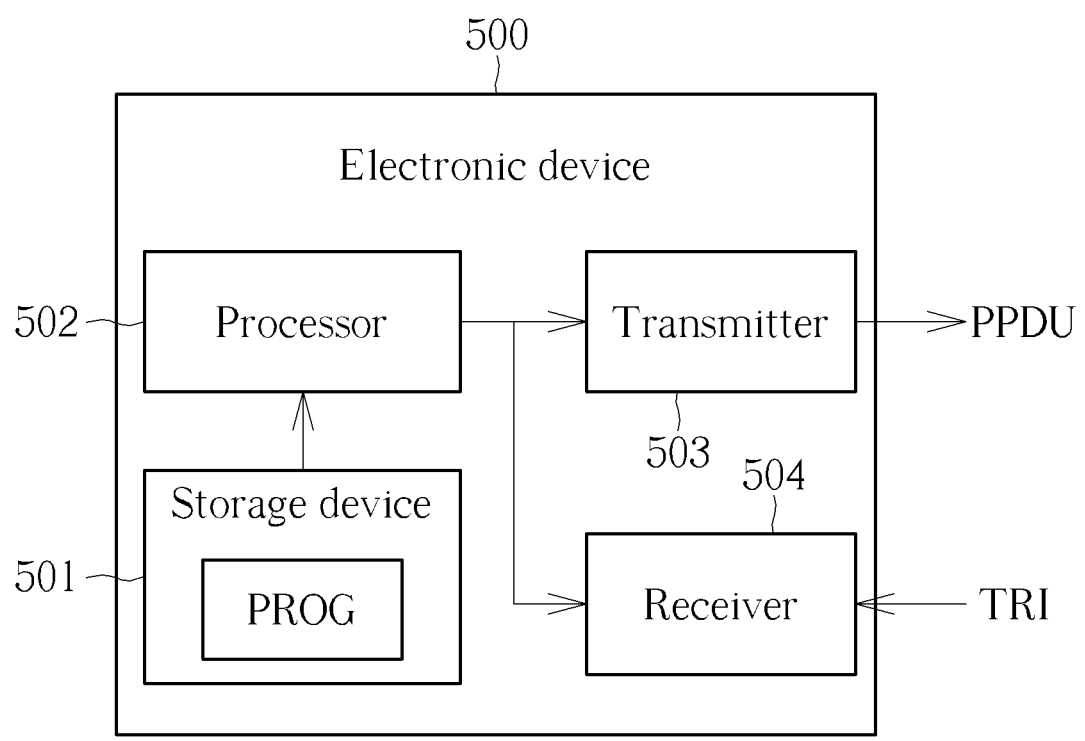
FIG. 5 is a diagram illustrating an electronic device according to an embodiment of the present invention.

FIG. 5 is a diagram illustrating an electronic device 500 applying the wireless communication methods of FIG. 2 and FIG. 3 according to the present invention. As shown in FIG. 5, the electronic device 500 comprises a storage device 501 for storing a program code PROG and a processor 502, a transmitter 503, and a receiver 504, wherein the processor 502 is arranged to execute the wireless communicating method proposed by the present invention, and further arranged to control the transmitter 503 to transmit the PPDU to an AP, and to control the receiver 504 to receive the trigger frame TRI from the AP. When loaded and executed by the processor 502, the program code PROG instructs the processor 502 to execute the wireless communicating method shown in the flowchart in FIGS. 2 and 3. The detailed description is omitted here for brevity.

Briefly summarized, the embodiments of the present invention propose a wireless communication device and an associated wireless communication method to save the length of the PPDU as well as the communication time and power, by calculating the length of the PPDU without referring to the length estimated by the AP, and generating the PPDU according to the calculated length.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, comprising:
an aggregation circuit, arranged to generate a Physical Layer Convergence Procedure (PLCP) Protocol Data Unit (PPDU);
a processing circuit, coupled to the aggregation circuit, wherein the processing circuit generates a first indicator indicating a length of the PPDU and includes the first indicator into a first field in a preamble of the PPDU;
a transmitter, coupled to the processing circuit, arranged to transmit the PPDU to an access point (AP);
a receiver, arranged to receive a trigger frame from the AP; and
a control circuit, coupled to the receiver, wherein the control circuit is arranged to check the trigger frame to generate a checking result indicating whether the trigger frame is only transmitted to the wireless communication device;
a calculating circuit, coupled to the aggregation circuit, wherein the calculating circuit is arranged to calculate the length of the PPDU at least according to a sequence number information, and the aggregation circuit executes the aggregation operation to generate the PPDU according to the length of the PPDU calculated by the calculating circuit when the checking result indicates that the trigger frame is only transmitted to the wireless communication device.

2. The wireless communication device of claim 1, wherein the first field in the preamble of the PPDU is a Legacy Signal Field (L-SIG).

3. The wireless communication device of claim 1, wherein the control circuit checks a receiver access (RA) field or a user information field in the trigger frame to generate the checking result.

4. The wireless communication device of claim 1, wherein the calculating circuit is further arranged to calculate the length of the PPDU according to the trigger frame when the checking result indicates that the trigger frame is not only transmitted to the wireless communication device, and the aggregation circuit executes the aggregation operation to generate the PPDU according to the length of the PPDU calculated by the calculating circuit.

5. The wireless communication device of claim 4, wherein the calculating circuit calculates the length of the PPDU according to a second indicator of a second field in a preamble of the trigger frame.

6. The wireless communication device of claim 5, wherein the second field in the preamble of the trigger frame is a Legacy Signal Field (L-SIG).

7. A wireless communication method of a wireless communication device, comprising:
generating a Physical Layer Convergence Procedure (PLCP) Protocol Data Unit (PPDU);
generating a first indicator indicating a length of the PPDU and including the first indicator into a first field in a preamble of the PPDU;
transmitting the PPDU to an access point (AP);
receiving a trigger frame from the AP;

checking the trigger frame to generate a checking result indicating whether the trigger frame is only transmitted to the wireless communication device; and calculating the length of the PPDU at least according to a block acknowledgement (BA) sequence number;

wherein the step of generating the PPDU comprises:

generating the PPDU according to the length of the PPDU when the checking result indicates that the trigger frame is only transmitted to the wireless communication device.

8. The method of claim 7, wherein the first field in preamble of the PPDU is a Legacy Signal Field (L-SIG).

9. The method of claim 7, wherein the step of checking the trigger frame to generate the checking result comprises:

checking a receiver access (RA) field or a user information field in the trigger frame to generate the checking result.

10. The method of claim 7, further comprising:

calculating the length of the PPDU according to the trigger frame when the checking result indicates that the trigger frame is not only transmitted to the wireless communication device;

wherein the step of executing the aggregation operation to generate the PPDU comprises:

executing the aggregation operation to generate the PPDU according to the length of the PPDU.

11. The method of claim 10, wherein the step of calculating the length of the PPDU according to the trigger frame comprises:

calculating the length of the PPDU according to a second indicator of a second field in a preamble of the trigger frame.

12. The method of claim 11, wherein the second field in the preamble of the trigger frame is a Legacy Signal Field (L-SIG).

13. An electronic device, comprising:

a transmitter, arranged to transmit signals to an access point (AP);

a storage device, arranged to store a program code; and a processor, arranged to execute the program code;

wherein when loaded and executed by the processor, the program code instructs the processor to execute the following steps:

executing an aggregation operation to generate a Physical Layer Convergence Procedure (PLCP) Protocol Data Unit (PPDU);

generating a first indicator indicating a length of the PPDU and including the first indicator into a first field in a preamble of the PPDU; and controlling the transmitter to transmit the PPDU to the AP;

receiving a trigger frame from the AP;

checking the trigger frame to generate a checking result indicating whether the trigger frame is only transmitted to the wireless communication device; and calculating the length of the PPDU at least according to a block acknowledgement (BA) sequence number;

wherein the step of generating the PPDU comprises:

generating the PPDU according to the length of the PPDU when the checking result indicates that the trigger frame is only transmitted to the wireless communication device.

14. The electronic device of claim 13, wherein the first field in the preamble of the PPDU is a Legacy Signal Field (L-SIG).

\* \* \* \* \*